United States Patent Office 3,379,704
Patented Apr. 23, 1968

3,379,704
PROCESS FOR POLYMERIZING CONJUGATED DI-
OLEFINS AND NOVEL CATALYST SYSTEM USE-
FUL THEREIN
Hermann Winter and Heinrich Weber, Marl, Germany,
assignors to Chemische Werke Huls, Aktiengesellschaft,
Marl, Germany
No Drawing. Filed June 26, 1963, Ser. No. 290,650
Claims priority, application Germany, July 3, 1962,
C 27,371
17 Claims. (Cl. 260—94.3)

ABSTRACT OF THE DISCLOSURE

A catalyst permitting a high degree of control of molecular weight characteristics in the polymerization of diolefins, such catalyst containing the following proportions of components:
(a) 1000 grams of an inert hydrocarbon diluent;
(b) 1–20 gram-millimols of aluminum compounds which consist essentially of:
    (1) an aluminum hydrogen halide complex of the formula $AlH_mX_{3-m} \cdot Y$ wherein $m$ is in the range of 0.1–2 inclusive; X is a halogen; and Y is an organic complex forming agent which contains a non-carbonaceous atom having at least one lone electron pair, and
    (2) an aluminum trihalide, the molar ratio of the aluminum hydrogen halide complex to the aluminum halide being between 0.01 and 100;
(c) a hydrocarbon-soluble compound of a first transition series metal selected from the group consisting of vanadium, cobalt and nickel, the mol ratio of the aluminum compounds to the first transition series metal compound being from 100:1 to 1:1.

This invention relates to a new catalyst composition particularly useful for the polymerization of diolefins, and to the products produced thereby.

There are known processes for the polymerization of butadiene and isoprene based on a catalyst system of (1) cobalt or nickel compounds, and (2) organo-aluminum compounds, especially alkyl-aluminum halides, in the presence of inert diluents. From butadiene, polybutadiene is obtained with a very high proportion in the 1,4 cis form. These known processes, however, present difficulties, especially when it is desirable to produce molecular weight values and distributions suitable for industrial purposes.

An object of this invention, therefore, is to provide a novel catalyst composition which permits a high degree of control of molecular weight values and distributions.

Another object is to provide novel intermediates for the preparation of the catalyst composition.

A further object is to provide a process for the production of polyolefins, particularly polydiolefins, based on the novel catalyst composition of this invention.

Upon further study of the specification and appended claims, other objects and advantages of the present invention will become apparent.

To attain the objects of this invention, it has been discovered that diolefins can be polymerized advantageously if use is made of mixed catalysts of vanadium or cobalt or nickel compounds, aluminum hydrogen halides, compounds which form complexes with aluminum hydrogen halides, and aluminum halides.

In the preparation of the catalyst composition, the charged components and their reaction products do not require any metal-carbon bonds, thereby obviating the heretofore necessary use of an organo-metallic compound as defined by G. E. Coates, Organo-Metallic Compounds, London; Methuen & Co. Ltd., New York; John Wiley & Sons, Inc., 1956.

The production of the aluminum hydrogen halide is accomplished successfully in the presence of compounds which form complexes with these aluminum hydrogen chlorides, as for example by reacting the aluminum halides with the hydrides of metals of Groups I to III of the Periodic Table, as for example sodium hydride, lithium hydride, aluminum hydride or lithium aluminum hydride.

Suitable compounds which form complexes with aluminum hydrogen halides are those which will fill the octet vacancy of aluminum hydrogen chloride in the monomeric form, as for instance an ether such as dimethyl ether, diethyl ether, dibutyl ether, anisole, diphenyl ether, a thioether such as diethylsulfide; an amine such as triethylamine, diphenylamine, pyridine; an organo-substituted phosphine such as the aromatic-substituted triphenyl phosphine; and nitrocompounds such as nitromethane and nitrobenzene.

It is to be here noted that these complex-forming agents are bonded to the aluminum atom through an atom other than carbon, and that this non-carbonaceous atom must contain at least one lone electron pair, preferably only one electron pair, as defined for example by Karrer, Organic Chemistry, Fourth English edition, Elsevier Publishing Co., Inc., New York, Amsterdam, London, Brussels, p. 65. Obviously then an organic chemist of ordinary skill can select a wide variety of other equivalent complex-forming agents which fulfill the preceding requirements. Such equivalent compounds are, therefore, intended to be within the scope of this invention.

Utilizing these complex-forming agents, aluminum halide complexes of the type $AlH_mX_{3-m}$—Y are formed, where depending on the proportions of the components, $m$ may be in the range of 0.1–2, preferably in the range of 0.3–1, X is a halogen such as chlorine, fluorine, bromine or iodine, and Y is the complex-former such as ether, which forms complexes with the aluminum hydrogen chlorides. In practice the compounds are generally not prepared with $m$ equal to 1 or 2, but rather as mixtures in which $m$ has intermediate values between 0.1 and 2. The pure aluminum halide complexes are relatively stable, as for example, the aluminum monohydride dihalide ethers which can be distilled under vacuum without decomposition. It generally suffices to distill off the excess of uncombined complex former, such as ether.

The aluminum hydrogen halide complexes when combined with vanadium, cobalt or nickel compounds generally are weak as polymerization catalysts.

They do become highly active, however, when they are combined with aluminum halides. The ratio of the aluminum hydroge halide complexes to the aluminum halides can be between 0.01 and 100, and preferably between 0.1 and 10. For economic reasons, and also from the standpoint of polymerization, a ratio of about 5 parts complex to 1 part halide is especially advantageous.

The total concentration of all the aluminum compounds which are introduced for polymerization can be very low. As a rule, concentrations of 20 millimol/kg. of added diluent and down to about 1 millimol are sufficient.

Vanadium, cobalt or nickel compounds which are suitable especially in inert hydrocarbons, are the soluble salts of carboxylic acids such as the metal propionate, butyrate, octeate, stearate or naphthenate, and also metal complexes such as vanadium, cobalt or nickel acetylacetonate. The salts of mineral acids, especially the halides, can also be introduced, but they are preferably combined with builders of complexes, e.g. chelating agents, such as alcohols or amines, which will increase the solubility of such salts in hydrocarbons. Actually, the anionic portion of these compounds of vanadium, cobalt or nickel is of no significant importance with respect to catalytic activity, as the nature of the anion merely controls the extent of solubility of the vanadium, nickel or cobalt cation in the inert hydrocarbon or equivalent solvent. The important consideration is that vanadium, cobalt or nickel cations be present in the catalyst composition.

The ratio of the aluminum compounds to the vanadium, cobalt or nickel compounds lies generally between 100 and 1, and preferably between 20 and 5. It means that their concentrations can be extremely low, down to about 0.01 millimol/kg. of diluent.

As inert diluents for polymerization, the aliphatic, cycloaliphatic and especially the aromatic hydrocarbons such as benzene are suitable. It is also possible to use mixtures of these hydrocarbons, whereby the molecular weights of the polymers can be controlled to a certain extent if necessary. Aside from the use of hydrocarbon solvents, there are equivalent solvents such as, for example, halogenated hydrocarbons, e.g. $CCl_4$ which can function as inert diluent.

Suitable polymerization temperatures range from about —30 to about +80° C., and are preferably between 0 and 50° C. The polymerization can be conveniently conducted under atmospheric pressure, although pressures either above or below atmospheric can be used, but are generally not required. It is important, however, to exclude air and moisture, so that generally for the production of the catalysts and for the polymerization process, it is necessary to use a gas, such as nitrogen or argon, which is inert to the catalyst composition.

Among the diolefins which can be polymerized by this process, butadiene-(1,3) is especially suitable, while isoprene and piperylene can also be used. Mixtures of these can also be used, as well as copolymers, especially of butadiene and isoprene. In general, this invention is particularly useful for the polymerization of conjugated diolefinic hydrocarbons of 4–6 carbon atoms. With respect to the ratio of catalyst composition to monomer, it is to be appreciated that a finite concentration of catalyst affects the polymerization to a finite extent; however, it is preferred to employ a concentration of catalyst to monomer of about 0.01 to 10 parts by weight catalyst to 100 parts by weight monomer.

The catalyst of this invention as compared with those formed of organo-aluminum compounds have a distinct advantage in not being so extremely sensitive to hydrogen and oxygen. Moreover, by the use of butadiene, polybutadienes of a high cis- content are obtained.

Furthermore, by suitably adjusting the ratio of hydrogen to halogen, and the ratio of aluminum to cobalt or nickel in the catalyst, the polydiolefins of the desired molecular weights can be easily produced.

Thus the molecular weight of the polydiolefins will increase with a decreasing ratio of hydrogen to halogen in the aluminum compound having the formula $$AlH_mX_{3-m} \cdot Y$$

Moreover, their molecular weight will increase with an increasing ratio of the aluminum halide to the aluminum compound of the formula $AlH_mX_{3-m} \cdot Y$. Finally, when the concentration of the aluminum compound having the formula $AlH_mCl_{3-m} \cdot Y$ is kept constant, the molecular weight of the polydiolefins will increase with increasing ratios of aluminum/cobalt, aluminum/nickel or aluminum/vanadium.

Without further elaboration it is believed that one skilled in the art can, using the preceding description, utilize the present invention to its fullest extent. The following preferred specific embodiments are, therefore, to be construed as merely illustrative, and not limitative, of the remainder of the specification and claims in any way whatsoever.

Example 1

For the production of $AlHCl_2$ etherate, 263 g. (1.97 mol) $AlCl_3$ are dissolved in 250 mol ether and 25 g. (0.66 mol) $LiAlH_4$ in 400 ml. ether. The ether solution of $AlCl_3$ is added drop by drop to the ether solution of $LiAlH_4$ with exclusion of moisture and oxygen. The temperature must not rise above 30° C. The product becomes dark gray. After a few hours the LiCl separates as a white precipitate from which the liquid is removed by centrifuging. The ether is then distilled off in a high vacuum at 37° C. The ether complex A which remained behind has a density of 1.1162. Upon analysis it gave $Al=15.69\%$, $Cl=41.8\%$, $C=26.57\%$, $H=6.1\%$, corresponding quite accurately to a complex of the formula $AlHCl_2 \cdot$ether. (Where "ether" is referred to by itself, reference is made to diethyl ether.)

9 g. $AlCl_3$ were then dissolved at 60° C. with stirring in 20 ml. of this ether complex A with exclusion of air and moisture. A gray liquid B is thus produced, which solidifies at room temperature. For better manipulation, the liquid can be diluted with benzene.

Into a 3-necked bottle equipped with an agitator, 1 liter anhydrous benzene, 2 mols butadiene and 0.6 millimol cobalt acetylacetonate are introduced with exclusion of air and moisture. 8 ml. of the above described liquid B are then added, which contains 30 millimols aluminum compounds. A lively polymerization commences, and is cooled externally to keep the temperature down to 30° C. After 3 hours the polymerization is stopped by adding acetone. The polybutadiene, precipitated by the continued dropwise addition of alcohol, is washed, and then dried in a vacuum chamber at 30° C. There is obtained 100 g. polymer with an RV (reduced viscosity=viscosity number; see Macromolekulare Chemie, (1960) vol. 38, p. 9) of 0.5. The polymer according to infrared analysis contains 96% 1,4-cis-, 3% 1,4-trans-, and 1% 1,2-isomers.

Example 2

The production of aluminum hydrogen chloride etherate is brought about, as in Example 1, by the reaction in stoichiometric amounts of $AlCl_3$ and $LiAlH_4$ ether solution, followed by centrifuging and distillation of the ether complexes in a high vacum of about 0.1 mm. Hg at 58 to 64° C., yielding ether-complex C. Upon analysis it gave $Al=14.15\%$, $Cl=47\%$, $C=24.6\%$ and $H=5.4\%$, corresponding to an empirical formula $AlH_{0.48}Cl_{2.52} \cdot$ether.

In 20 ml. of the above described ether complex C, 6 g. $AlCl_3$ were dissolved to a complex solution D. Butadiene was then polymerized with the same reactants and under the same conditions as in Example 1, but 8 ml. of solution D replaced solution B. The resulting polymer contains 97% 1,4-cis-, 2% 1,4-trans-, and 1% 1,2-polybutadiene. It is practically free from gel and has an RV (reduced viscosity) of 2.2.

If less than 6 g. $AlCl_3$ are dissolved in 20 ml. ether complex C, polymers with low RV values will be obtained, whereas if more than 6 g. $AlCl_3$ are dissolved, polymers with higher RV values will be obtained. (See table.)

| Ether complex C, ml. | $AlCl_3$, g. | Yield, Percent | RV | Gel, Percent | Configuration of the Polymers | | |
|---|---|---|---|---|---|---|---|
| | | | | | 1,4-trans | 1,2 | 1,4-cis |
| 20 | 4 | 90 | 0.5 | 1 | 2 | 2 | 96 |
| 20 | 6 | 87 | 2.2 | 3 | 2 | 1 | 97 |
| 20 | 8 | 88 | 0.8 | 73 | 7 | 2 | 91 |

It will be seen that with increased AlCl₃ additions, there will first be an increased RV value and then an increased amount of gel formation, which would correspond to increased polymerization.

Example 3

As an aluminum hydrogen chloride ether complex, a substance having the composition $AlH_{0.3}Cl_{2.7}$ ether (Complex E) is used in this example, which was produced in the same manner as in Example 1. It can be distilled at 62 to 64° C. under $10^{-4}$ mm. Hg. Upon analysis it gave: Al=13.75%, Cl=48.7%, C=23.85%, and H=5.18%.

In 20 ml. of this complex, 3 g. AlCl₃ were dissolved as in Example 1. (Complex solution F.)

Polymerization occurs under the same conditions and with the same concentrations as in Example 1. As a catalyst, 8 ml. of the above described Solution F is used. The polymer thus produced is practically free from gel and has a RV of 2.9.

Also in this example, it will be observed that the properties of the polymers and especially their RV's depend on the amounts of AlCl₃, as the table shows.

| Ether complex E, ml. | AlCl₃, g. | Yield, Percent | RV | Configuration of the polymers | | | Gel, Percent |
|---|---|---|---|---|---|---|---|
| | | | | 1,4-trans | 1,2 | 1,4-cis | |
| 8 | 2 | 83 | 0.5 | 1 | 2 | 97 | ---------- |
| 8 | 3 | 90 | 2.9 | 1 | 1 | 98 | 3 |
| 8 | 4 | 85 | 2.2 | 2 | 1 | 97 | 17 |

The cobalt acetyl acetonate concentration is 0.66 millimol/liter in all preparations, and the butadiene concentration 2 mol/liter. (It is also to be noted that cobalt is used with a valence of II.)

By comparing the first table with the second one, it will be seen that with increased hydrogen content in the hydrogen aluminum chloride etherate, more AlCl₃ will have to be dissolved to produce polymers of the same molecular weight.

Naturally it is also possible in this example to control the molecular weight by regulating the catalyst concentration.

Example 4

Polymerization with Vanadium-III acetyl acetonate and hydrogen aluminum chloride etherates is conducted as in Example 2, except that instead of the cobalt acetyl acetonate, 0.4 millimol Vanadium-III acetyl acetonate is employed. There is thus produced a highly crystalline 1,4-trans-polybutadiene with a yield of 25%.

Example 5

Example 2 is repeated except that the reactants are added in the following order—cobalt acetyl acetonate, butadiene and the complex solution C, and lastly, the aluminum halide.

$AlH_{0.5}Cl_{2.5}$ ether is prepared as in Example 2. Into a 3-necked bottle equipped with an agitator, 1 liter anhydrous benzene, 2 mol butadiene and 0.66 millimol cobalt acetyl acetonate are introduced. 6.6 ml. of Complex C (see Example 2) are then added. The mixture changes color, but there is no polymerization. Upon addition of 13 millimols AlBr₃, a brown color with polymerization makes its first appearance. There is thus produced a polybutadiene with 96%, 1,4-cis, 2%, 1,4-trans, and 2%, 1,2-isomer.

Example 6

With the same catalyst system, isoprene can also be polymerized. The production of the catalyst and the polymerization proceeds in the same manner as in Example 2, but instead of 2 mols butadiene, 2 mols isoprene are added. Furthermore, only 5 ml. of Complex Solution D are used. There is produced a polymer containing 43% 3,4- and 57% 1,4-cis isomers. The yield is 80%, and the RV is 1.8.

Example 7

For the copolymerization of isoprene and butadiene, the catalyst production and the polymerization proceed in the same manner as in Example 6. 1 mol isoprene and 1 mol butadiene are introduced. An infrared analysis of the polymers gave 73% butadiene residues of which 60% were 1,4-cis, 2% 1,4-trans, and 11% 1,2-isomers. The remaining 27% consisted of isoprene residues of which 23% were 1,4-cis and 4% were 3,4-isomers.

Example 8

Into a 3-necked flask equipped with an agitator, 1 liter anhydrous benzene, 10 millimol nickel acetyl acetonate and 16 ml. of a solution of 6 g. AlCl₃ in the Complex C (see Example 2) were introduced with exclusion of air and moisture. 4 mols butadiene were then introduced during 5 hours at 60° C. A liquid polybutadiene was obtained, consisting of 88% 1,4-cis, 10%, 1,4-trans, and 2% 1,2-isomers. The molecular weight was 30,000.

From the foregoing description, one skilled in the art can easily ascertain the essential characteristics of this invention, and without departing from the spirit and scope thereof, can make various changes and modifications of the invention to adapt it to various usages and conditions. For example, it will occur to the skilled chemist that aside from vanadium, cobalt and nickel compounds, other metals of the first transition series will be likely to exhibit catalytic activity in the catalytic composition of the present invention. Consequently, such changes and modifications are properly, equitably, and intended to be, within the full range of equivalence of the following claims.

What is claimed as this invention is:

1. A novel catalyst composition which consists essentially of the following proportions of components:
   (a) 1000 grams of an inert hydrocarbon diluent;
   (b) 1–20 gram millimols of aluminum compounds which consist essentially of:
      (1) an aluminum hydrogen halide complex of the formula $AlH_mX_{3-m} \cdot Y$ wherein $m$ is in the range of 0.1–2 inclusive; X is an halogen; and Y is an organic complex forming agent selected from the group consisting of amines, ethers, thioethers, organo-substituted phosphines and organo-nitro compounds which contains a non-carbonaceous atom having at least one lone electron pair, and
      (2) an aluminum trihalide, the molar ratio of the aluminum hydrogen halide complex to the aluminum halide being between 0.01 and 100;
   (c) a hydrocarbon-soluble compound of a first transition series metal selected from the group consisting of vanadium, cobalt and nickel, the mol ratio of the aluminum compounds to the first transition series metal compound being from 100:1 to 1:1.

2. The catalyst composition of claim 1 wherein the aluminum trihalide is aluminum chloride.

3. The catalyst composition of claim 2 wherein the first transition series metal is vanadium.

4. The catalyst composition of claim 2 wherein the first transition metal is nickel.

5. The catalyst composition of claim 2 wherein the first transition series metal is cobalt.

6. A process for the polymerization of conjugated diolefinic hydrocarbons of 4–6 carbon atoms, which process comprises polymerizing said hydrocarbons at a temperature of about —30° to about +80° C., in contact with a catalyst composition which consist essentially of the following proportions of components:
(a) 1000 grams of an inert hydrocarbon diluent;
(b) 1–20 gram millimols of aluminum compounds which consist essentially of:
(1) an aluminum hydrogen halide complex of the formula $AlH_mX_{3-m} \cdot Y$ wherein $m$ is in the range of 0.1–2 inclusive; X is an halogen; and Y is an organic complex forming agent selected from the group consisting of amines, ethers, thioethers, organo-substituted phosphines and organo-nitro compounds which contains a non-carbonaceous atom having at least one lone electron pair, and
(2) an aluminum trihalide, the molar ratio of the aluminum hydrogen halide complex to the aluminum halide being between 0.01 and 100;
(c) a hydrocarbon-soluble compound of a first transition series metal selected from the group consisting of vanadium, cobalt and nickel, the mol ratio of the aluminum compounds to the first transition metal compound being from 100:1 to 1:1.

7. The process of claim 6 wherein the hydrocarbon to be polymerized is selected from the group consisting of butadiene-(1,3), piperylene and isoprene.

8. The process of claim 7 wherein the aluminum trihalide is aluminum chloride.

9. The process of claim 8 wherein the first transition series metal is vanadium.

10. The process of claim 8 wherein the first transition series metal is nickel.

11. The process of claim 8 wherein the first transition series metal is cobalt.

12. A catalyst composition as defined by claim 1 wherein $m$ is in the range of 0.3–1, inclusive.

13. A catalyst composition as defined by claim 12 wherein the molar ratio of the aluminum hydrogen halide complex to the aluminum halide is between 0.1 and 10.

14. A catalyst composition as defined by claim 13 wherein the mol ratio of the aluminum compounds to the first transition series metal compound is from 20:1 to 5:1.

15. A process as defined by claim 6 wherein $m$ is in the range of 0.3–1, inclusive.

16. A process as defined by claim 15 wherein the molar ratio of the aluminum hydrogen halide complex to the aluminum halide is between 0.1 and 10.

17. A process as defined by claim 16 wherein the mol ratio of the aluminum compounds to the first transition series metal compound is from 20:1 to 5:1.

References Cited

UNITED STATES PATENTS

| | | | |
|---|---|---|---|
| 3,245,976 | 4/1966 | Marconi et al. | 260—94.3 |
| 3,222,348 | 12/1965 | Duck et al. | 260—94.3 |
| 3,056,771 | 10/1962 | Aldridge et al. | 260—94.3 |
| 3,066,127 | 11/1962 | Carlson et al. | 260—94.3 |

OTHER REFERENCES

Gippin, I and EC Product Research & Development, vol. 1, No. 1.

JAMES A. SEIDLECK, *Primary Examiner.*

JOSEPH L. SCHOFER, *Examiner.*

E. J. SMITH, *Assistant Examiner.*